US00RE36632E

United States Patent [19]

Iwanade

[11] E Patent Number: Re. 36,632

[45] Reissued Date of Patent: Mar. 28, 2000

[54] AUTOMATIC ORIGINAL FEEDING DEVICE

[75] Inventor: Hisao Iwanade, Tokyo, Japan

[73] Assignee: Asahi Kogaku Kogyo Kabushiki Kaisha, Tokyo, Japan

[21] Appl. No.: 08/322,141

[22] Filed: Oct. 13, 1994

Related U.S. Patent Documents

Reissue of:

[64] Patent No.: 5,194,970
Issued: Mar. 16, 1993
Appl. No.: 07/608,796
Filed: Nov. 5, 1990

[30] Foreign Application Priority Data

Nov. 6, 1989 [JP] Japan ..... 1-289675

[51] Int. Cl.[7] ..... H04N 1/08

[52] U.S. Cl. ..... 358/498; 271/265; 271/227; 355/308; 358/496

[58] Field of Search ..... 358/498, 496; 271/227, 258, 259, 261, 262, 265, 266; 355/308, 316

[56] References Cited

U.S. PATENT DOCUMENTS

| | | | |
|---|---|---|---|
| 3,790,159 | 2/1974 | Hatzmann et al. | 358/498 |
| 4,326,222 | 4/1982 | Connin et al. | 358/498 |
| 4,763,160 | 8/1988 | Honjo | 271/227 |
| 5,038,222 | 8/1991 | Saito | 358/498 |

FOREIGN PATENT DOCUMENTS

| | | | |
|---|---|---|---|
| 1247773 | 9/1971 | United Kingdom | 358/498 |
| 1448333 | 9/1974 | United Kingdom . | |

*Primary Examiner*—Edward L. Coles, Sr.
*Assistant Examiner*—Thomas D. Lee
*Attorney, Agent, or Firm*—Greenblum & Bernstein, P.L.C.

[57] ABSTRACT

A sheet feeding device for feeding a plurality of cut-type sheets, having been stacked in an accommodating member, one by one toward a predetermined position in response to a predetermined signal to be applied to the sheet feeding device. The sheet feeding device comprises: a first feeding member for feeding the stacked sheets to another predetermined position in response to the predetermined signal, a second feeding member for feeding the sheet, having been fed by the first feeding member, to the predetermined position after a feeding operation executed by the first feeding member and a controlling member for controlling the first feeding member so as not to be operated during a feeding operation executed by the second feeding member. Thus, according to the present invention, it becomes possible to avoid sheet jamming caused by sheets having been fed together in an overlapped state.

24 Claims, 3 Drawing Sheets

AUTOMATIC ORIGINAL FEEDING DEVICE

Matter enclosed in heavy brackets [ ] appears in the original patent but forms no part of this reissue specification; matter printed in italics indicates the additions made by reissue.

BACKGROUND OF THE INVENTION

The present invention relates to an automatic original feeding device adapted to be positioned in a copying machine, and the like. More particularly the present invention relates to an automatic original feeding device capable of detecting whether a plurality of originals have been mistakenly fed together in an overlapped state and are thus inhibiting an original feeding operation. If the overlapped state of the originals is detected, the jamming of the originals is avoided.

As shown in FIG. 1, a conventional automatic original feeding device used in copying machines and the like comprises an accommodation unit 2 for accommodating a plurality of original sheets 1 in a stacked state, an original feed loader 4 for feeding the originals 1 one by one from the accommodation unit 2 to a reading unit 3 on which an image on the original is read in response to a data reading command, and an original discharge loader 5 for discharging the original 1 whose image has been read at the reading unit 3.

A detection switch 6 is provided with the accommodation unit 2 to detect the presence of the originals in the accommodation unit 2. A detection switch 7 is provided with the original feed loader 4 to determine the amount of feeding required for locating the whole original 1 at the reading unit 3. In other words, by detecting a leading edge or a trailing edge of the original 1 by the detection switch 7, it becomes possible to determine the amount of feeding required for locating the whole original 1 at the reading unit 3, in accordance with the feeding speed of the original 1 as well as the distance from the detection switch 7 to the reading unit 3. Further, a detection switch 8 is provided with the original discharge loader 5 to detect whether the original 1 is completely discharged from the reading unit 3.

Next, a feeding operation executed by the conventional device arranged as described above will be described with reference to a flowchart shown in FIG. 2.

First, in step S1, when the detection switch 6 detects that at least one original 1 is contained in the accommodation unit 2, (i.e., the detection switch 6 is turned on), a pulse motor (not shown) is rotated by a predetermined amount in step S2 to cause the original 1 to be fed to the original feed loader 4. The original 1 is then fed to the reading unit 3 by the rotation of the original feed loader 4.

Thereafter, in step S4, it is determined whether the detection switch 7 is turned off or not. When it is determined that the detection switch 7 is turned off, (i.e., after the trailing edge of the original is passed through the position at which the detection switch 7 is located), the flow goes to step 5, where the original 1 is completely fed into the reading unit 3 by driving the original feed loader 4 by another predetermined amount of feeding.

When the original 1 has been fed into the reading unit 3, a scanner (not shown) is operated to read the image on the original 1 in step S6. When the image on the original 1 has been read, the pulse motor (not shown) is driven to discharge the read original 1 by the original discharge loader 5 in step S7.

Thereafter, the flow goes to step S8, where it is determined whether the detection switch 8 is turned off. When it is determined that the detection switch 8 is turned off, (i.e., the trailing edge of the original 1 is passed through the position at which the detection switch 8 is located), the pulse motor is rotated, in step S9, and the whole original 1 is completely led to the desired position, for example, at which a discharge tray is provided. In other words, it is possible to determine an amount of feeding required for feeding the whole original 1 to the desired position by detecting the passing of the trailing edge of the original 1 through the position at which the detection switch 8 is located.

Nevertheless, in the above arranged conventional automatic original feeding device, since the pulse motor is driven to feed the original toward the reading unit 3 when the detection switch 6 detects the presence of the original 1, a new original is fed to the reading unit 3 from the accommodation unit 2 in response to a feeding command even if an original sheet has been mistakenly fed to the position of the detection switch 7 by means of, for example, an undesirable vibration of the accommodation unit 2 or the like. Thus, the originals may be fed together in an overlapped state into the reading unit 3, and further, the next original is fed into the reading unit 3 regardless of whether the plurality of originals fed together still remain at the reading unit 3. This often causes jams of the originals.

SUMMARY OF THE INVENTION

It is therefore an object of the invention to provide an improved automatic original feeding device capable of detecting whether a plurality of originals have been mistakenly fed in an overlapped state or not and inhibiting an original feeding operation if it is detected that the plurality of originals have been fed.

For this purpose, according to the present invention, there is provided a sheet feeding device for feeding a plurality of cut-type sheets having been stacked in an accommodating member one by one, toward a predetermined position in response to a predetermined signal to be applied to the sheet feeding device . The sheet feeding device comprises:

a first feeding mechanism for feeding stacked sheets to another predetermined position in response to a predetermined signal;

a second feeding mechanism for feeding the sheet having been fed by the first feeding mechanism to a predetermined position after a feeding operation is executed by the first feeding mechanism; and a controlling mechanism for controlling the first feeding mechanism so as not to be operated during a feeding operation executed by the second feeding mechanism.

With the above arranged automatic original feeding device, it becomes possible to inhibit the original feeding operation when the originals have been mistakenly fed even if the feeding command was given, and thus, the jam of the originals can be prevented.

DESCRIPTION OF THE ACCOMPANYING DRAWINGS

DESCRIPTION OF THE EMBODIMENTS

An embodiment of the present invention will be described below with reference to the drawings.

Figure 3:
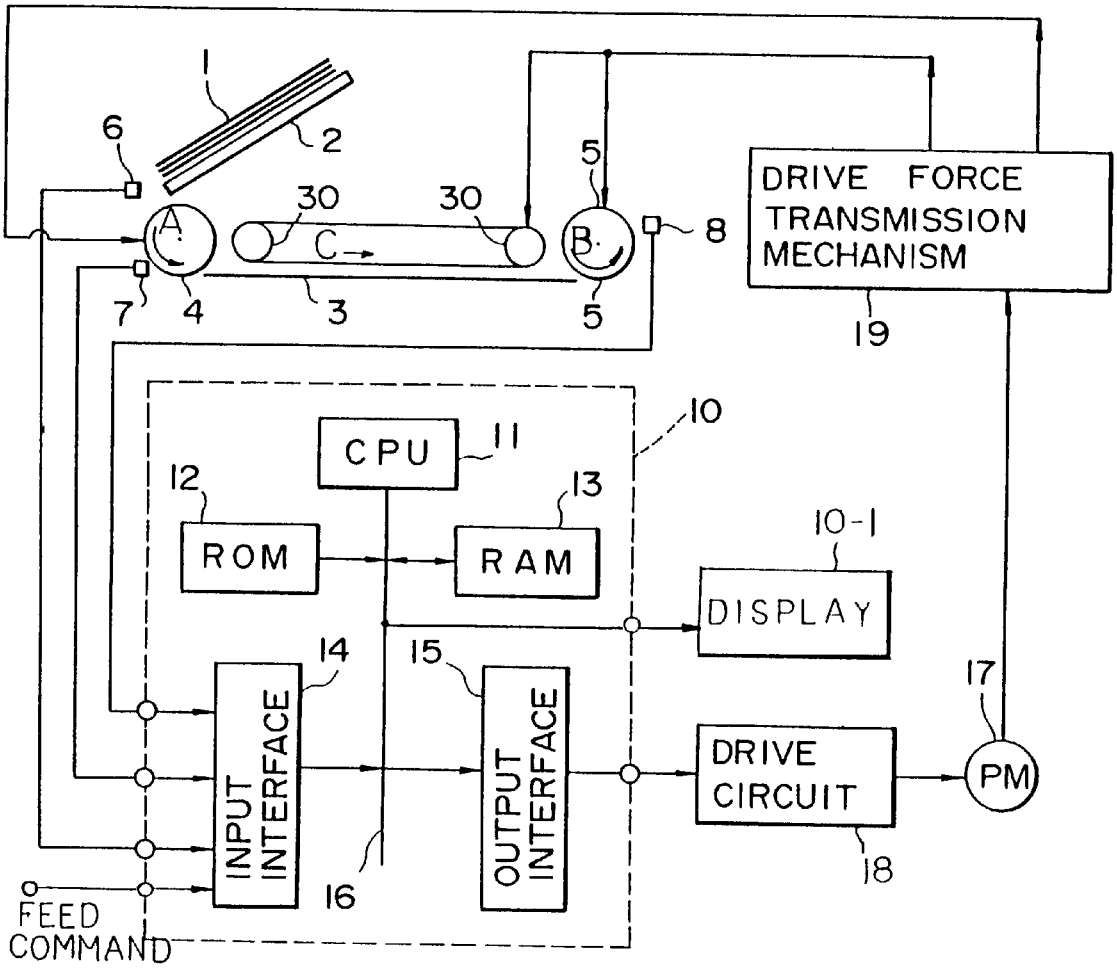
FIG. 3 is an overall arrangement of an embodiment of an automatic original feeding device according to the present invention.

FIG. 3 is an overall arrangement of an embodiment of an automatic original feeding device according to the present invention.

Figure 1:
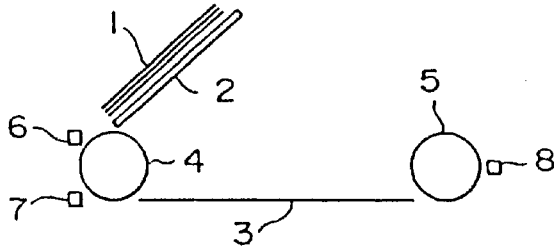
FIG. 1 PRIOR ART
FIG. 1 is a schematic arrangement of a conventional automatic original feeding device.
Figure 2:
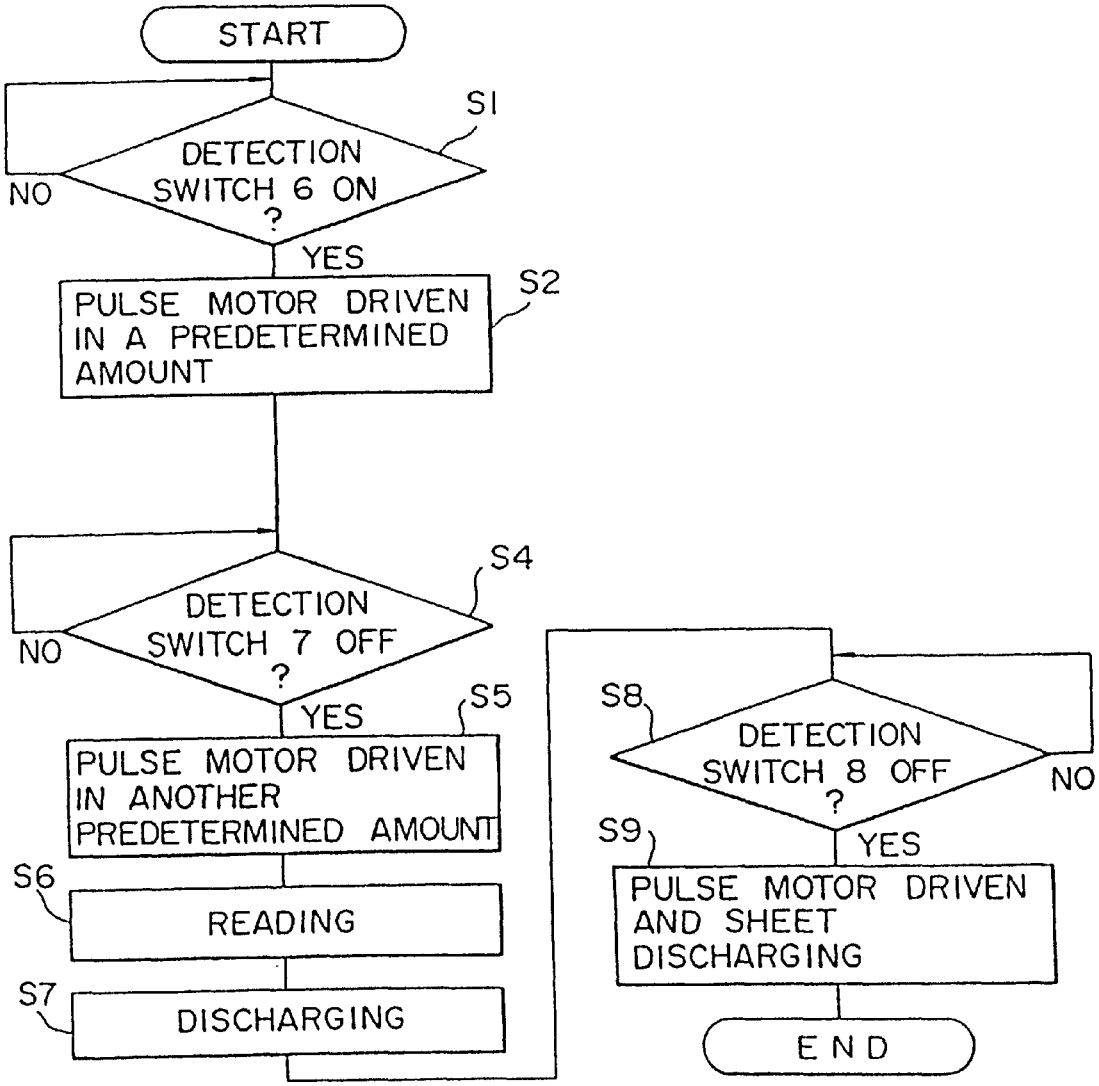
FIG. 2 PRIOR ART
FIG. 2 is a flowchart showing the operating sequence of a conventional automatic original feeding device thereof.

Similarly to that shown in FIG. 1, the automatic original feeding device shown by the present embodiment comprises an original accommodation unit 2, an original reading unit 3, an original feeding loader 4, an original discharge loader 5, and detection switches 6, 7 and 8 provided with the respective units.

Designated at 10 is a control unit for controlling the whole automatic original feeding device according to the present invention, which comprises, for example, a microcomputer, and the like in this embodiment.

The control unit 10 comprises a CPU (Central Processing Unit) 11 for managing and controlling the whole device A ROM (Read Only Memory) 12 is provided having stored therein a processing program for feeding and discharging the originals 1, a processing program for reading the image on the original 1 which is located at the reading unit 3, and the like. A RAM (Random Access Memory) 13 temporarily stores the result of the arithmetic operation effected by the CPU and other data. An input interface 14 which transmits a feeding command from an t external device, a switch provided in the automatic original feeding device and the like, and an output interface 15 are interconnected to the CPU 11 through a bus 16.

On the reading unit 3, a feeding belt 35 is provided in order to feed the original 1 at the desired position on the reading unit 3, (i.e., the original 1 having been traveled by the original feeding loader 4 is further fed to the desired position by the feeding belt 35 which is driven by a pair of feeding rollers 30, 30). The scanner 36, for reading the data having been represented on the original, is provided below the reading unit 3. The reading unit 3 includes a transparent plate on which the original 1 is to be located so that the light from the scanner reaches the surface of the original. The surface of the original is scanned by light from the scanner, and the reflected light on surface is read as the data.

The driving force from the pulse motor 17 is transmitted toward either the original feeding loader 4 or the original discharge loader 5 and the pair of feeding rollers 30, 30 through a drive force transmission mechanism, for example, a so-called one-way clutch. In other words, the original feeding loader 4 is driven to rotate as indicated by an arrow "A" only when the pulse motor 17 is forwardly rotated, while the feeding belt 35 as well as the original discharge loader 5 are driven to rotate as respectively indicated by arrows "B" and "C" only when the pulse motor 17 is reversely rotated.

The respective detection switches 6, 7, and 8 are respectively arranged to be ON-operated when they detect the original 1 and are connected to the input interface 14. The output interface 15 is connected through a drive circuit 18 to a pulse motor 17, which drives the original feeding loader 4 and the original discharge loader 5.

Figure 4:
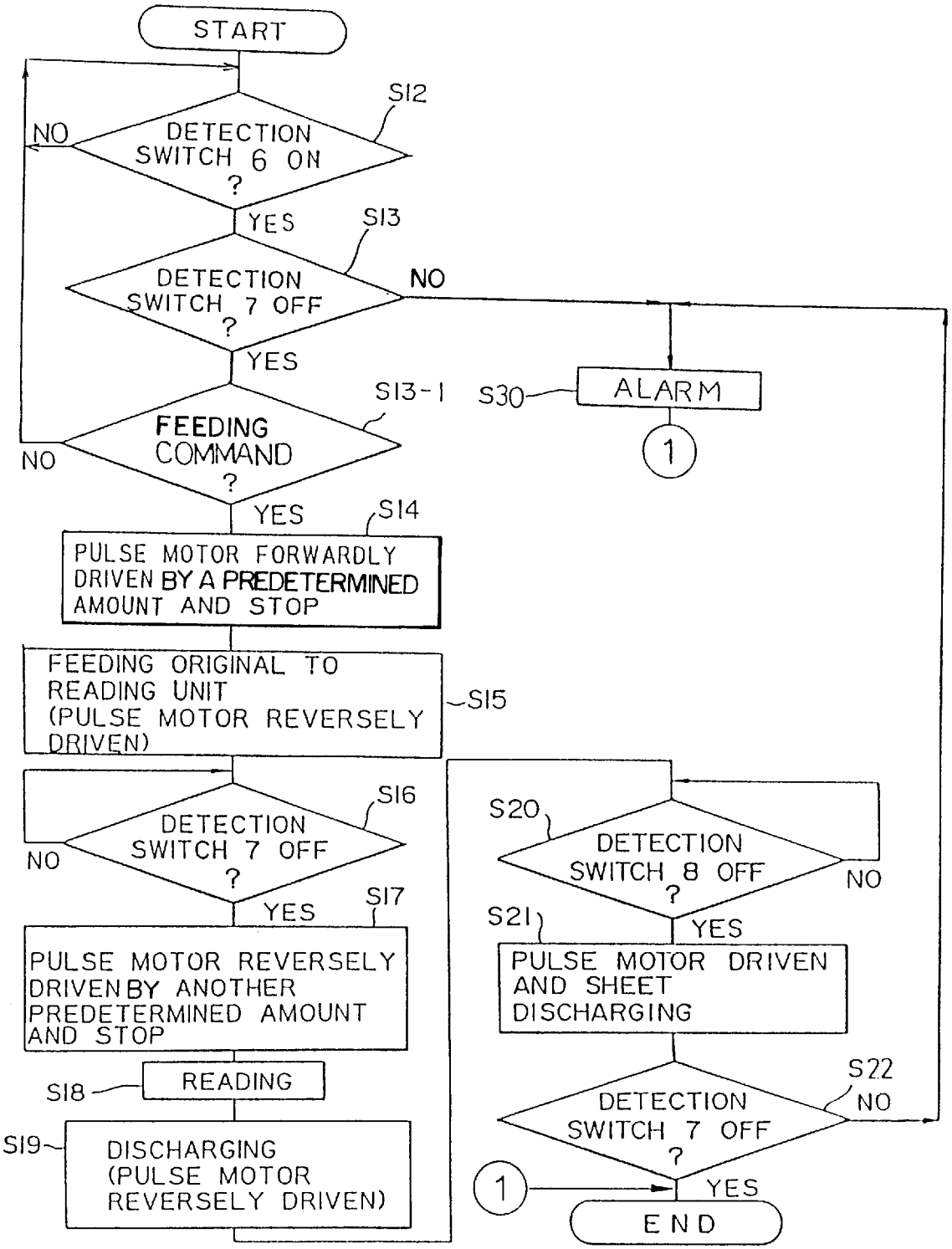
FIG. 4 is a flowchart showing the operating sequence of the automatic original feeding device shown in FIG. 3.

Next, the operation of the present embodiment arranged as explained above will be described below with reference to a flowchart shown in FIG. 4.

After a program is started by means of an initializing operation of the control unit 10, it is determined in step S12 whether the detection switch 6 is turned on by the original 1 (i.e., at least one original 1 is contained in the accommodation unit 2). If the detection switch 6 is determined to be turned on, in step S13, it is then determined whether the detection switch 7 is turned on. If it is determined that the detection switch 7 is turned on in step S13, an alarm such as a buzzer, light emitting diode and the like is driven in step S30 for indicating that an original has been mistakenly fed to the position at which the detection switch 7 is located. In FIG. 3, the alarm is represented as a display 10-1 for visually indicating that the above-described mistake has occurred. When the original 1 has been located at the detection switch 7, an amount of feeding from the accommodation unit 2 to the feeding roller 30, described later, can not be controlled.

If it is determined that the detection switch 7 is turned off in step S13, and a feeding command is awaited in step S13-1. The feeding command is applied, as shown in FIG. 3, to the CPU 11 through the input interface 14 from either a not shown switch or an external device to be electrically connected to the automatic original feeding device.

When it is determined that the feeding command is applied in step S13-1, the flow goes to step S14, at which the control unit 10 controls the drive circuit 18 so as to drive the original feeding loader 4 for feeding the original 1 having been contained in the accommodation unit 2. The pulse motor 17 is forwardly driven until the leading edge of the top sheet of the stacked originals in the accommodation unit 2 reaches the position at which one of the pair of feeding rollers 30, 30, is located (i.e., the upstream side feeding roller 30). In other words, since the distance between the one of the feeding rollers 30 and the position from which the original 1 is fed by the original feeding loader 4 has been previously determined (i.e., an amount of feeding required for feeding the original 1 from the accommodation unit 2 to the one of feeding rollers 30 can be determined in advance), the leading edge is accurately located at the one of feeding rollers 30 by the amount of feeding of the original 1.

Further, in step SIS, the pulse motor 17 is started to be reversely rotated for driving the feeding belt 35 so that the original 1 is fed into the reading unit 3. If a sheet has mistakenly fallen from the accommodation unit 2 during the feeding operation by means of the original feeding loader 4, two sheets are fed together toward the feeding belt 35. However, the original having been correctly fed has previously reached the feeding belt 35, so that only this sheet is fed by the feeding belt 35 since the original feeding loader 4 is not rotated when the feeding belt 35 is driven. Further, if a sheet has mistakenly fallen from the accommodation unit 2 when the feeding operation by means of the original feeding loader 4 is finished and the feeding operation by means of the feeding belt 35 is started, the fallen sheet is not fed since the original feeding loader 4 is not rotated.

Thereafter, in step S16, it is determined whether the detection switch 7 is turned off by detecting a passing of the trailing edge of the original being fed by means of the feeding belt 35. When the trailing edge of the original is passed through the position at which the detection switch 7 is located, the flow goes to step S17 and the feeding belt 35 is further driven in another predetermined amount and the original is completely fed into the reading unit 3, the feeding operation is stopped and the original 1 is located at the desired position at which the reading operation is executed. The predetermined amount at the step S17 is measured by a counting operation, executed by the CPU 11, of pulses arranged to be generated as the pulse motor 17 is rotated. For example, a disk plate, not shown, having a plurality of slits each radially extending from the rotary center thereof is arranged in such a manner that it is synchronously rotated with the step motor 17. Further, an encoder comprising a pair of light transmitting and light receiving elements, between which the disk plate is located, are provided, so that a plurality of pulses, corresponding to an amount of rotation of the pulse motor, (i.e., an amount of feeding of the original 1), are generated by the encoder, and the number of pulses is compared with a predetermined value, corresponding to the desired amount of feeding of the original, previously stored in the ROM 12. Therefore, it becomes possible to feed the original 1 by the desired amount.

After the original 1 has been fed to the reading unit 3, the scanner 36 is operated to read an image on the original having been fed into the reading unit 3 in step S18. Further, the pulse motor 17 is reversely driven again to rotate the original discharge loader 5 as well as the feeding belt 35 to discharge the original 1 from the reading unit 3 in step S19. In this embodiment, the original discharge roller 5 and the feeding belt 35 are simultaneously driven as shown in FIG. 3, however, the feeding belt 35 and the original discharge roller 5 can be separately driven.

Thereafter, in step S20, it is determined whether the detection switch 8 is turned on or not by detecting the presence of the trailing edge of the original 1. If it is determined that the detection switch 8 is turned off in step S20, the pulse motor 17 is driven to rotate for further feeding the original 1 by another predetermined amount required for feeding the original 1 to the desired position, for example, a position at which the discharge tray, not shown, is provided in step S21. The predetermined amount at the step S21 is measured by another counting operation, executed by the CPU 11 and the above described encoder to be synchronously operated for generating the pulses as the step motor 17 is rotated. In step S22, it is determined whether the detection switch 7 is turned on. After the original 1 has been accurately fed by the predetermined amount in step S21, the detection switch 7 is definitely turned off. If it is determined, in step S22, that the detection switch 7 is turned on, the flows goes to step S30 on the assumption that trouble such as a jam has been occurred.

According to the above-described embodiment, if an original has mistakenly fallen from the accommodation unit by means of, for example, an undesirable vibration thereof as the previous original is fed, the fallen original is prevented from being fed to the reading unit together with the previous one. Therefore, the problem of a jam caused by two originals being fed together can be avoided.

The present disclosure relates to subject matter contained in Japanese patent application No. 01-289675 (filed on Nov. 6, 1989) which is expressly incorporated herein by reference in its entirety.

What is claimed is:

1. A sheet feeding device for feeding a plurality of cut-type sheets, having been stacked in an accommodating member, one by one towards a predetermined position, said sheet feeding device further comprising:

a sensor for detecting the presence of a sheet at an upstream side of said predetermined position;

first feeding means for feeding individual cut sheets of said plurality of stacked sheets to another predetermined position when said sensor detects the absence of a sheet;

second feeding means for feeding the sheet, having been fed by said first feeding means, towards said predetermined position after a feeding operation executed by said first feeding means and while said sensor detects the presence of the sheet, said second feeding means further feeding the sheet by a predetermined amount to said predetermined position after said sensor detects the absence of the sheet; and controlling means for controlling said first feeding means so as not to be operated during a feeding operation executed by said second feeding means.

2. The sheet feeding device according to claim 1, which further comprises sheet detecting means for detecting the presence of a sheet in said accommodating member, and indication means for indicating a predetermined indication in case the presence of a sheet is detected by said sensor before said first feeding means executes a feeding operation.

3. The sheet feeding device according to claim 1, wherein said first feeding means comprises a loader member arranged to be driven to rotate by means of a predetermined drive source.

4. The sheet feeding device according to claim 3, wherein said drive source comprises a step motor.

5. The sheet feeding device according to claim 1, wherein said sheets are originals on which an image data to be read are respectively represented, and which further comprises data reading means located at said predetermined position for reading the data on each of said originals, whereby each of said originals are fed *by said first feeding means and said second feeding means* to said predetermined position at which the image data are to be read [by said first feeding means and said second feeding means].

6. An original feeding device, adapted to be positioned in a device including at least a data reading unit for reading an image data having been represented on a surface of each of originals, comprising accommodating means for accommodating a plurality of cut-type originals in a stacked state, said original feeding device further comprising:

a sensor provided at an upstream side of said data reading unit for detecting the presence of an original;

first feeding means for feeding the original, having been accommodated in said accommodating means, to a predetermined position one by one when said sensor detects the absence of an original;

second feeding means for feeding the sheet, having been fed by said first feeding means towards said data reading unit, after a feeding operation executed by said first feeding means, while said sensor detects a presence of an original, said second feeding means further feeding the original by a predetermined amount to said data reading unit after said sensor detects the absence of the original; and controlling means for controlling said first feeding means so as not to be operated during a feeding operation executed by said second feeding means.

7. A sheet feeding process utilizing cut-type sheets arranged to be accommodated in a stacked state within a predetermined case member and to be fed along a predetermined feeding path one by one from said case member in response to a predetermined signal applied from a predetermined device, said sheet feeding process further comprising:

feeding the sheet to a predetermined position located at a downstream side of said predetermined case member;

feeding the sheet towards another predetermined position located at a downstream side of said predetermined position without a feeding operation from said predetermined case member to said predetermined position; and further feeding the sheet to said another predetermined position after a sensor provided at an upstream side of said another predetermined position detects the trailing edge of the sheet.

8. The sheet feeding process according to claim 7, wherein said sheets comprise originals respectively having image data to be read, wherein said predetermined signal comprises an original feeding command, and wherein a data reading unit for reading the data is located at said another predetermined position.

*9. A sheet feeding device for sequentially feeding a plurality of cut-type sheets, stacked in an accommodating member, towards a predetermined position, said sheet feeding device comprising:*

*a sensor for detecting the presence of a sheet at an upstream side of said predetermined position;*

*first feeding means for feeding one of said plurality of stacked sheets by a fixed amount, from said accommodating member to a designated position which is located upstream of said predetermined position, wherein said sensor detects the presence of a predetermined sheet when said predetermined sheet is located at said designated position;*

*second feeding means for feeding said predetermined sheet, which has been fed by said first feeding means, away from said designated position; and*

*control means for controlling said second feeding means to continue feeding said predetermined sheet while said sensor detects the presence of a sheet, wherein said control means controls said second feeding means to feed said predetermined sheet by a predetermined amount, so that said predetermined sheet is located at said predetermined position after said sensor has detected the absence of a sheet, and for controlling said first feeding means so as not to be operated during a feeding operation executed by said second feeding means.*

*10. The sheet feeding device of claim 9, said predetermined sheet is a single sheet fed from said accommodating member.*

*11. The sheet feeding device of claim 9, said predetermined sheet is a first sheet of two sheets fed together from said accommodating member.*

*12. The sheet feeding device according to claim 9, further comprising sheet detecting means for detecting the presence of a sheet in said accommodation member, and means for indicating the presence of a sheet by said sensor before said first feeding means executes a feeding operation.*

*13. The sheet feeding device according to claim 9, wherein said first feeding means comprises a loader member arranged to be driven to rotate by means of a predetermined drive source.*

*14. The sheet feeding device according to claim 13, wherein said drive source comprises a step motor.*

*15. The sheet feeding device according to claim 9, wherein said sheets are originals on which image data to be read is provided, and further comprising data reading means located at said predetermined position for reading image data on each of said originals, whereby each of said originals are fed to said predetermined position, at which image data is to be read, by said first feeding means and said second feeding means.*

*16. The sheet feeding device according to claim 9, said control means comprising means for actuating an alarm in response to said sensor detecting the presence of a sheet after said predetermined sheet is discharged from said predetermined position.*

*17. The sheet feeding device according to claim 9, said control means comprising means for actuating an alarm in response to said sensor detecting the presence of sheet upon actuation of said device.*

*18. The sheet feeding device according to claim 9, said control means further comprising means for enabling said predetermined sheet to be fed by said predetermined distance and then stopped, when said sensor detects the absence of said sheet, and for enabling said predetermined sheet to be fed and discharged, when said sensor detects the presence of said sheet.*

*19. An automatic sheet feeding device for sequentially feeding sheet material from a supply of stacked sheets to a processing position, said device comprising:*

*a feed loader device for pulling off one sheet at a time from said stacked sheets and advancing said pulled off sheet to a feed location;*

*feeding means, provided at said a feed location, for feeding said sheet to said processing position;*

*a detection switch, arranged upstream of said feeding means, said detection switch signaling a presence of sheet material in a feeding path; and*

*means for controlling said feeding means to stop said sheet at the processing position only if said detection switch signals the absence of sheet material in the feeding path, after having signalled the presence of sheet material in the feeding path, and for controlling said feed loader device so as not to be operated during a feeding operation executed by said feeding means.*

*20. The automatic sheet feeding device according to claim 19, said sheet being fed without being stopped at said processing station if said detection device does not signal the absence of sheet material in the feed path, after having signalled the presence of sheet material in the feeding path.*

*21. The automatic sheet feeding device according to claim 19, comprising means for stopping said feed loader device while said feeding means is feeding a sheet.*

*22. The automatic sheet feeding device according to claim 19, further comprising at least one motor for driving said feed loader device and for driving said feeding means, and a control unit for controlling said at least one motor for driving said feeder loader device if said detection switch signals the absence of sheet material.*

*23. The automatic sheet feeding device according to claim 19, further comprising a feeding device, arranged downstream of said feeding means, for discharging said sheet from said processing position.*

*24. The automatic sheet feeding device according to claim 23, further comprising means for providing an alarm in response to said detection switch detecting the presence of sheet material, after said sheet has been discharged by said feeding device.*

* * * * *